US009405359B2

United States Patent
Rhee et al.

(10) Patent No.: US 9,405,359 B2
(45) Date of Patent: Aug. 2, 2016

(54) PLANE-CHARACTERISTIC-BASED MARKERLESS AUGMENTED REALITY SYSTEM AND METHOD FOR OPERATING SAME

(75) Inventors: Seon Min Rhee, Seoul (KR); Do Kyoon Kim, Seongnam-si (KR); Yong Beom Lee, Seoul (KR); Tae Hyun Rhee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 13/823,593

(22) PCT Filed: Jul. 16, 2012

(86) PCT No.: PCT/KR2012/005645
§ 371 (c)(1),
(2), (4) Date: Jun. 7, 2013

(87) PCT Pub. No.: WO2013/015549
PCT Pub. Date: Jan. 31, 2013

(65) Prior Publication Data
US 2013/0265392 A1 Oct. 10, 2013

Related U.S. Application Data

(60) Provisional application No. 61/512,480, filed on Jul. 28, 2011.

(30) Foreign Application Priority Data

Jul. 11, 2012 (KR) ........................ 10-2012-0075387

(51) Int. Cl.
G09G 5/00 (2006.01)
G06F 3/00 (2006.01)
G06F 3/03 (2006.01)
G06F 3/0481 (2013.01)
G06T 19/00 (2011.01)
G06T 7/20 (2006.01)

(52) U.S. Cl.
CPC .............. *G06F 3/005* (2013.01); *G06F 3/0304* (2013.01); *G06F 3/04815* (2013.01); *G06T 7/2046* (2013.01); *G06T 19/006* (2013.01); *G06F 2203/04804* (2013.01); *G06T 2207/30244* (2013.01)

(58) Field of Classification Search
None
See application file for complete search history.

(56) References Cited

FOREIGN PATENT DOCUMENTS

| JP | 2004-054308 A | 2/2004 |
|---|---|---|
| JP | 2005-56059 | 3/2005 |

(Continued)

OTHER PUBLICATIONS

Ding et al.; Range image segmentation based on randomized hough transform, IEEE; Information, Communication and Signal Processing, 2003 and Fourrth Pacific Rim conference on Multimedia. Proceedings of the 2003 Joint Conference of the 4th internation conference vol. 2. p. 808-811.*

(Continued)

*Primary Examiner* — Peter Hoang
(74) *Attorney, Agent, or Firm* — NSIP Law (57) ABSTRACT

A marker-less augmented reality system that may extract a plurality of planes included in an image generated by a camera, based on three-dimensional (3D) information of the image, and may estimating a pose of the camera based on a correspondence among the plurality of planes extracted, and an operating method thereof.

23 Claims, 9 Drawing Sheets

(56) References Cited

FOREIGN PATENT DOCUMENTS

| | | |
|---|---|---|
| JP | 2008-286756 A | 11/2008 |
| JP | 2009-110304 A | 5/2009 |
| JP | 2009-196860 A | 9/2009 |
| JP | 2011-008687 A | 1/2011 |
| JP | 2011-141828 A | 7/2011 |
| KR | 10-1002785 | 12/2010 |
| KR | 10-1010904 | 1/2011 |
| KR | 10-1013751 | 2/2011 |
| KR | 10-2011-0042971 | 4/2011 |
| KR | 10-2011-0081759 | 7/2011 |
| KR | 10-1080073 | 10/2011 |

OTHER PUBLICATIONS

Ding et al.; Range Image Segmentation Using Randomized Hough Transform; IEEE; Information, Communication and Signal Processing, 2003 and Fourth Pacific Rim Conference on Multimedia. Proceedings of the 2003 Joint Conference of the 4th International conference vol. 2 p. 807-811.*

International Search Report of Corresponding PCT Application PCT/KR2012/005645 mailed Jan. 10, 2013.

Extended European Search Report issued on Feb. 16, 2015 in counterpart European Patent Application No. 12818138.5 (8 pages, in English).

Gordon, Gaile, et al. "The use of dense stereo range data in augmented reality." *Proceedings of the 1st International Symposium on Mixed and Augmented Reality*. IEEE Computer Society, 2002. (10 pages, in English).

Kim, Kiyoung, Vincent Lepetit, and Woontack Woo. "Scalable real-time planar targets tracking for digilog books." *The Visual Computer* 26.6-8 (2010): 1145-1154. (10 pages, in English).

Schwarz, Loren Arthur, et al. "Tracking planes with time of flight cameras and j-linkage." *Applications of Computer Vision (WACV), 2011 IEEE Workshop on*. IEEE, 2011. (8 pages, in English).

Rhee, Seon-Min, et al. "Pose estimation of a depth camera using plane features." *Consumer Electronics (ICCE), 2013 IEEE International Conference on*. IEEE, 2013. (2 pages, in English).

Rhee, Seon-Min, et al. "Split and merge approach for detecting multiple planes in a depth image." *Image Processing (ICIP), 2012 19th IEEE International Conference on*. IEEE, 2012. (4 pages, in English).

International Search Report mailed Jan. 10, 2013 for corresponding International Application No. PCT/KR2012/005645.

Li, Bao, et al. "Robust normal estimation for point clouds with sharp features." Computers & Graphics 34.2 Jan. 28, 2010 (13 pages in English).

European Office Action issued on Nov. 9, 2015, in counterpart European Application No. 12818138.5 (5 pages in English).

Uematsu Hiroko, "Foundation 2: Geometric Registration Technique", Information processing, Japan, Information Processing Society of Japan, Apr. 15, 2010, vol. 51.4 (11 pages with English translation).

Japanese Office Action issued on Feb. 2, 2016 in counterpart Japanese Application No. 2014-522736 A. (6 pages with English Translation).

* cited by examiner

Select P₂ and P₃

PLANE-CHARACTERISTIC-BASED MARKERLESS AUGMENTED REALITY SYSTEM AND METHOD FOR OPERATING SAME

CROSS-REFERENCE TO RELATED APPLICATIONS

This application is a U.S. National Phase application of PCT/KR2012/005645 filed Jul. 16, 2012, which claims the priority benefit of U.S. Provisional Patent Application No. 61/512,480, filed on Jul. 28, 2011, in the United States Patent and Trademark Office, and Korean Patent Application No. 10-2012-0075387, filed on Jul. 11, 2012, in the Korean Patent Office, the contents of each of which are incorporated herein by reference.

BACKGROUND

1. Technical Field

Example embodiments of the following disclosure relate to a technology for estimating a pose of a camera based on three-dimensional (3D) information included in an image.

2. Background Art

An augmented reality refers to a technology for displaying graphic objects, or additional information, and a real image captured by a camera in an overlapping manner. In order to implement an accurate augmented reality, however, accurate estimation of a pose of a camera, that is, a location and a direction of the camera may be important. In order to estimate the location or direction of the camera, a predetermined marker may be used. Further, a method of estimating a relative location of a current camera in comparison to a location of a reference camera by disposing, in a real space, a predefined reference object, for example, a two-dimensional (2D) planar image or a three-dimensional (3D) model may be used.

Figure 1:
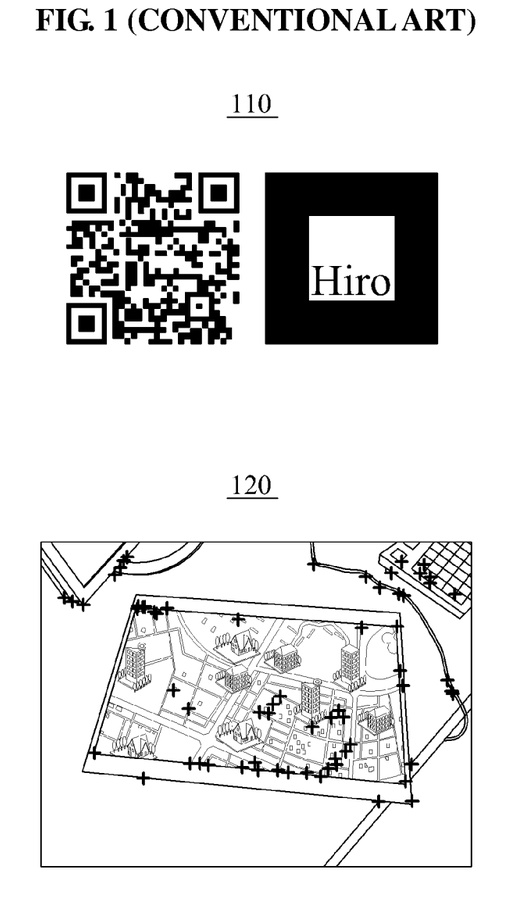
FIG. 1 illustrates examples of a marker, according to an art.

FIG. 1 illustrates examples of a marker according to an art.

Referring to FIG. 1, an upper part 110 of FIG. 1 illustrates markers that are prepared in advance, and may be provided in an artificial form, for example, Quick Response (QR) codes. A lower part 120 of FIG. 1 illustrates an example of using a 2D or 3D reference object existing naturally in a real image, as a marker. In the lower part 120 of FIG. 1, a monitor, a keyboard, and a picture disposed on the table may be used as reference objects.

As shown in the lower part 120 of FIG. 1, a case in which a 2D or 3D object is used as a marker may be classified as being marker-less in terms of using a natural reference object existing in a real space. However, in reality, such a case may correspond to a process using a marker since preparations, for example, storing the reference object as a marker in a database, and the like, may be required. In the lower part 120 of FIG. 1, point features marked with a plus sign (+) may be stored in the database in order to use the reference objects as markers.

Accordingly, in order to utilize an augmented reality technology, absent a delay, in a desired location and at a desired time without such advance preparations, marker-less camera tracking and matching without use of a reference object may be required.

In general, in an augmented reality technology, camera tracking and matching may be performed mainly using point features based on intensity information in a color image, irrespective of whether a marker is used. In this instance, a limitation that illumination conditions shall be constant and rich texture shall be used to find distinctive point features may exist in utilizing the intensity information of the color image.

In parallel tracking and mapping (PTAM), a representative example of a marker-less augmented reality technology, a method of finding point features from a color image, generating a map with respect to a 3D space using a correspondence between point features for each frame, and estimating a pose of a camera based on the generated map may be used. In particular, since a five point algorithm may be used to generate the map initially, at least five corresponding point features may need to be extracted. When texture is poor, extraction of point features may fail, and an augmented reality system may not operate normally.

SUMMARY

According to example embodiments, there is provided a marker-less augmented reality system, including a plane extracting unit to extract a plurality of planes included in an image generated by a camera, based on three-dimensional (3D) information of the image, a correspondence estimating unit to estimate a correspondence among the plurality of planes extracted, and a camera pose estimating unit to estimate a pose of the camera, based on the estimated correspondence.

The plane extracting unit may select a first point from the 3D information, select a second point and a third point positioned within a distance corresponding to a threshold value from the first point, and generate a plane model based on the selected first point, the selected second point, and the selected third point.

The plane extracting unit may extract the plurality of planes included in the image, based on the generated plane model.

The correspondence estimating unit may estimate the correspondence among the plurality of planes, based on a normal vector constituting each of the plurality of planes, or a distance from camera to each of the plurality of planes.

The plane extracting unit may extract a plurality of planes included in a plurality of frames constituting the image. The correspondence estimating unit may select a single frame from among the plurality of frames to be a reference frame, and may estimate the correspondence among the plurality of planes, based on a target plane included in the selected reference frame.

The correspondence estimating unit may select the target plane, based on one of a number of points included in the plurality of planes extracted, a direction of a normal vector between the plurality of planes, and a distance from the camera to each of the plurality of planes.

The correspondence estimating unit may estimate the correspondence among the plurality of planes, based on a direction of a normal vector between the target plane and planes included in each frame, or a distance from the camera to each of the plurality of planes.

The correspondence estimating unit may store the selected target plane in a plane information database, and may store a plane differing from the target plane, among the plurality of planes, in the plane information database.

The camera pose estimating unit may estimate rotation information or translation information of the camera based on the correspondence, and may estimate the pose of the camera based on the estimated rotation information or the estimated translation information.

The camera pose estimating unit may generate a rotation matrix based on a normal vector between planes for each frame included in the image, generate a translation matrix based on the generated rotation matrix, and a distance from the camera to each of the planes, and generate a transformation matrix based on the generated rotation matrix and the generated translation matrix.

The camera pose estimating unit may estimate the pose of the camera using the generated translation matrix.

According to other example embodiments, there is also provided a marker-less augmented reality system, including a plane extracting unit to extract a plurality of planes included in an image generated by a camera, based on 3D information of the image, and an augmented reality unit to match the image and a virtual object, using the plurality of planes extracted.

The plane extracting unit may select a first point from the 3D information, select a second point and a third point positioned within a distance corresponding to a threshold value from the first point, and extract the plurality of planes based on the selected first point, the selected second point, and the selected third point.

The marker-less augmented reality system may further include a camera pose estimating unit to estimate a pose of the camera, based on a correspondence among the plurality of planes extracted. In this instance, the augmented reality unit may match the image and the virtual object, based on the estimated pose of the camera.

The marker-less augmented reality system may further include a correspondence estimating unit to select a target plane based on one of a number of points included in the plurality of planes extracted, a direction of a normal vector between the plurality of planes, and a distance from the camera to each of the plurality of planes, and to estimate a correspondence among the plurality of planes based on a direction of a normal vector between the target plane and planes included in each frame, or a distance from the camera to each of the plurality of planes.

According to other example embodiments, there is also provided a method for marker-less augmented reality, the method including: estimating, by a processor, a correspondence among a plurality of planes extracted from an image, based on a determined target plane; estimating a pose of a camera that generated the image, based on the estimated correspondence; and matching the image and a virtual object of the image, using the extracted plurality of planes.

According to still other example embodiments, there is also provided an operating method of a marker-less augmented reality system, the method including extracting a plurality of planes included in an image, based on 3D information of the image, and estimating a pose of a camera that generates the image, based on a correspondence among the plurality of planes extracted.

According to example embodiments, an augmented reality technology may be utilized, without delay, in a desired place and at a desired time without advance preparations, for example, storing reference objects in a database in advance, and the like.

According to example embodiments, marker-less camera tracking and matching without use of reference objects may be possible.

According to example embodiments, a marker-less augmented reality system may be established, using three-dimensional (3D) information of an image acquired by a depth camera.

According to example embodiments, by estimating a camera motion using plane features extracted from an image, an augmented reality system may be used in an environment in which a conventional camera motion estimating technology using a color camera fails to operate normally.

According to example embodiments, when applying estimation of a camera motion, a range of application of technology for estimating a camera motion may be broadened by alleviating environmental limitations.

According to example embodiments, by fitting points in a 3D space to a plane, a outlier value may be removed automatically although noise exist with respect to a 3D coordinate value of an individual point, whereby high precision matching may be possible.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below in order to explain example embodiments by referring to the figures.

Figure 2:
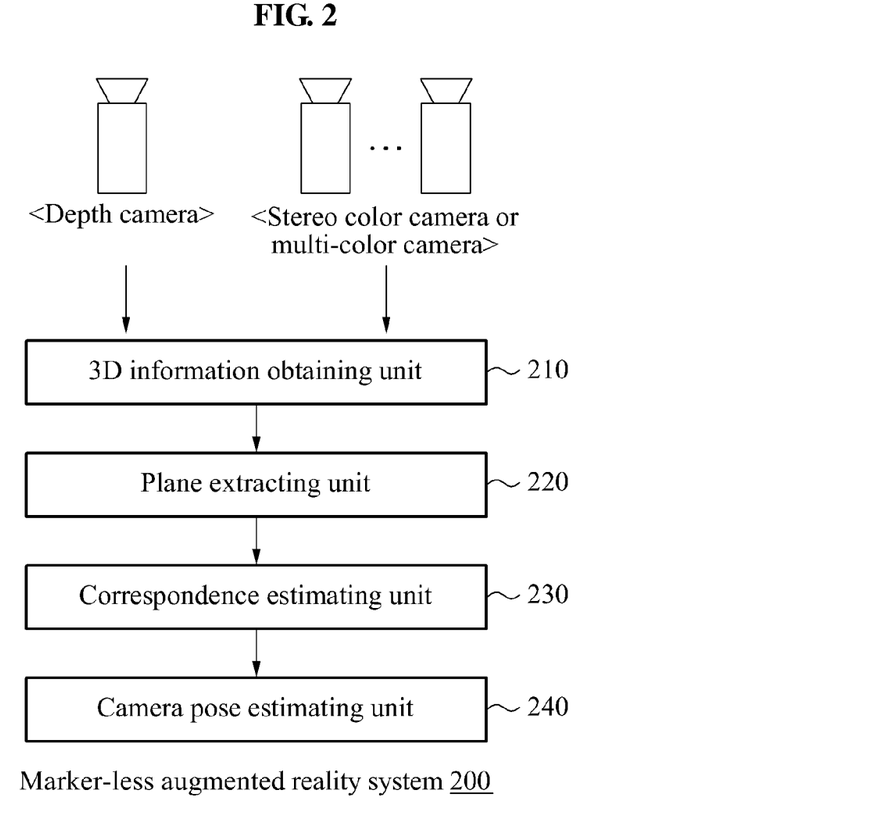
FIG. 2 illustrates a configuration of a marker-less augmented reality system, according to example embodiments.

FIG. 2 illustrates a configuration of a marker-less augmented reality system, according to example embodiments.

Referring to FIG. 2, a marker-less augmented reality system 200 may include a three-dimensional (3D) information obtaining unit 210, a plane extracting unit 220, a correspondence estimating unit 230, and a camera pose estimating unit 240. Each unit described above may include at least one processing device.

Since the marker-less augmented reality system 200 may estimate a pose of a camera using plane features extracted from an image, preparations, for example, storing a reference object in a database in advance, and the like, may be unnecessary, and thus, a marker-less augmented reality system may be established.

In order to obtain the plane features from the image, 3D information may be initially obtained from the image.

In particular, the 3D information obtaining unit 210 may acquire a depth image using a depth camera, and may obtain depth information from the acquired depth image, as 3D information. In addition, the 3D information obtaining unit 210 may obtain 3D information using color images acquired by a plurality of color cameras. Since a color image acquired by a color camera may correspond to a two-dimensional (2D) image, the 3D information obtaining unit 210 may obtain 3D information using the color images acquired by the plurality of color cameras, for example, stereo cameras, or multi-color cameras.

Hereinafter, both a depth image and a color image will be referred to as an 'image.'

The plane extracting unit 220 may estimate planes present in an image, based on the 3D information. For example, the plane extracting unit 220 may estimate a plane model more rapidly, based on a spatial coherency indicating that points constituting a plane are present in an adjacent space. The plane extracting unit 220 may randomly select a first point $P_1$ from the 3D information, and then may select a second point $P_2$ and a third point $P_3$ positioned within a threshold distance from the first point $P_1$. That is, the plane extracting unit 220 may establish a kd-tree with respect to points in a 3D space in order to extract points positioned within a threshold distance from the first point $P_1$, and may select the second point $P_2$ and the third point $P_3$ from among the points positioned within the threshold distance based on the first point $P_1$.

Figure 3:
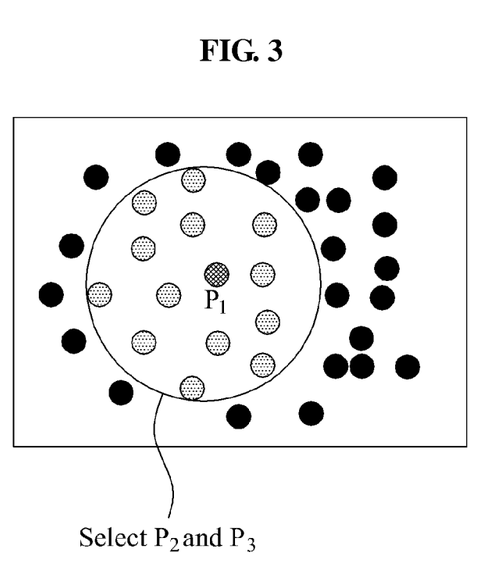
FIG. 3 illustrates an example of selecting points from three-dimensional (3D) information, according to example embodiments.

FIG. 3 illustrates an example of selecting points from 3D information, according to example embodiments.

Referring to FIG. 3, when each of a first point, a second point, and a third point is selected randomly, a longer period of time will be used to extract a plane model since a probability that the three points are present on an identical plane may be relatively low, when compared to a case in which three points are selected in an adjacent area. Accordingly, the plane extracting unit 220 may employ a process of selecting the first point, and then selecting the second point and the third point included in an adjacent area, for example, an area in a circle, positioned within a distance corresponding to a threshold value based on the first point, thereby extracting planes more rapidly than a random sample consensus (RANSAC) process.

The plane extracting unit 220 may generate a plane model, based on the selected first point, the selected second point, and the selected third point.

When $P_1$ corresponding to the first point, $P_2$ corresponding to the second point, and $P_3$ corresponding to the third point are determined to be positioned at coordinates (x1, y1, z1) (x2, y2, z2) (x3, y3, z3), respectively, coefficients A, B, and C of a plane equation may be obtained by determinants in Equation 1, shown below.

$$A = \begin{vmatrix} 1 & y1 & z1 \\ 1 & y2 & z2 \\ 1 & y3 & z3 \end{vmatrix}$$

$$B = \begin{vmatrix} x1 & 1 & z1 \\ x2 & 1 & z2 \\ x3 & 1 & z3 \end{vmatrix}$$

$$C = \begin{vmatrix} x1 & y1 & 1 \\ x2 & y2 & 1 \\ x3 & y3 & 1 \end{vmatrix}$$

$$D = -\begin{vmatrix} x1 & y1 & z1 \\ x2 & y2 & z2 \\ x3 & y3 & z3 \end{vmatrix}$$

[Equation 1]

In Equation 1, (A, B, C) denotes a normal vector indicating a direction of a plane, and D denotes a distance from a camera to a plane including the first point, the second point, and the third point.

The determinants in Equation 1 may be expanded, as expressed in Equation 2, shown below.

$A=y1(z2-z3)+y2(z3-z1)+y3(z1-z2)$ $B=z1(x2-x3)+z2(x2-x1)+z3(x1-x2)$ $C=x1(y2-y3)+x2(y3-y1)+x3(y1-y2)$ $-D=x1(y2z3-y3z2)+x2(y3z1-y1z3)+x3(y1z2-y2z1)$ [Equation 2]

The plane extracting unit 220 may obtain a plane equation using the calculated A, B, C, and D, as expressed by Equation 3, shown below.

$Ax+By+Cz+D=0$ [Equation 3]

Figure 4:
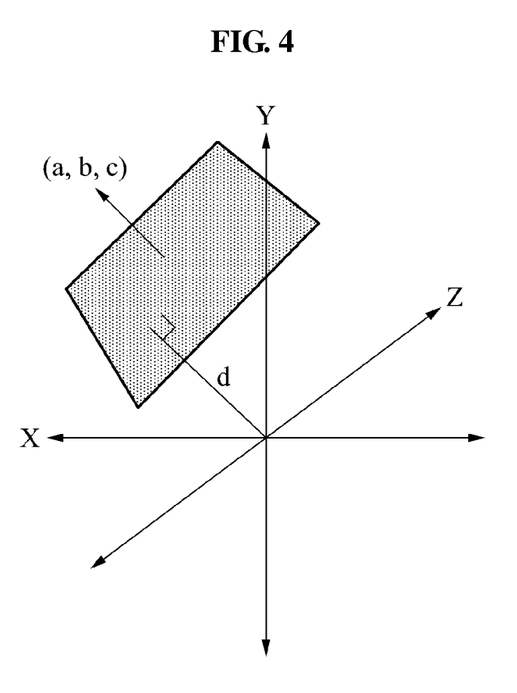
FIG. 4 illustrates a geometric meaning indicated by coefficients of a plane equation, according to example embodiments.

FIG. 4 illustrates a geometric meaning indicated by coefficients of a plane equation, according to example embodiments.

Referring to FIG. 4, (A, B, C) denotes a normal vector indicating a direction of a plane, and D denotes a distance from the origin to the plane. For example, when a plane from which three points are extracted is projected onto a coordinate system, D may correspond to a distance from the origin to the plane. Accordingly, depending on embodiments, D may be identical to a distance from a camera to the plane in a real space.

The plane extracting unit 220 may extract a plurality of planes included in an image, using a plane model. The plurality of planes may be indicated using a set of planes, as expressed by Equation 4 shown below.

$S^i=\{\Pi_j^i | a_j^i x+b_j^i x+c_j^i x+d_j^i x=0, 1 \le i \le n\}$ [Equation 4]

In Equation 4, $S^i$ denotes a set of planes extracted from a camera, i denotes a camera index, j denotes a plane number, and n denotes a total number of the extracted planes.

For example, $S^1$ denotes a plurality of planes extracted from a first camera, $S^2$ denotes a plurality of planes extracted from a second camera, and $S^i$ denotes a plurality of planes extracted from an $i^{th}$ camera.

A relatively small camera motion may indicate that an interval difference in normal vectors between adjacent frames may be relatively small. Accordingly, when the plane extracting unit 220 extracts planes for each frame included in an image, respectively, the correspondence estimating unit 230 may estimate a correspondence among the plurality of planes, based on a normal vector constituting each of the plurality of planes, and a distance from a camera to each of the plurality of planes.

Plane features indicated by each of the plurality of planes may be expressed using coefficients ai, bi, ci, and di of a plane equation. In this instance, the number of planes is not limited to three, and at least three planes may be included.

As an example, the plane extracting unit 220 may extract a plurality of planes included in a plurality of frames constituting the image. The correspondence estimating unit 230 may select a single frame from among the plurality of frames to be a reference frame. For example, when a first frame is selected to be the reference frame, and a currently extracted frame corresponds to the first frame, the correspondence estimating unit 230 may select a target plane to be tracked in reality from among the plurality of planes extracted, and may store the selected target plane in a database. However, the corresponding estimating unit 230 may select more than one target plane, and thus, the present disclosure is not limited to one target plane. The correspondence estimating unit 230 may estimate the correspondence among the plurality of planes, based on the target plane included in the selected reference frame.

As another example, the correspondence estimating unit 230 may select the target plane, based on one of a number of points included in the plurality of planes extracted, a direction of a normal vector between the plurality of planes, and a distance from the camera to each of the plurality of planes. For example, the correspondence estimating unit 230 may select the target plane, when a great number of points are included in the plurality of planes, when a difference in directions of normal vectors among the plurality of planes is great or significant, or when a distance between the camera to each of the plurality of planes is great or significant.

With respect to subsequent frames after the reference frame has been determined, the correspondence estimating unit 230 may estimate the correspondence among the plurality of planes, based on a direction of a normal vector between a target plane, which is stored in a plane information database, and a plane currently extracted, and a distance from the camera to each of the plurality of planes. The correspondence estimating unit 230 may store a plane differing from the target plane, among the plurality of planes, in the plane information database. That is, when a new plane absent in the plane information database, such as a new plane invisible from a view of the first camera, is detected in a current frame, the correspondence estimating unit 230 may store the new plane in the plane information database. Accordingly, the correspondence estimating unit 230 may enable camera tracking and virtual object matching in an area invisible in a first frame, by estimating a correspondence between the target plane and the plurality of planes.

Figure 5:
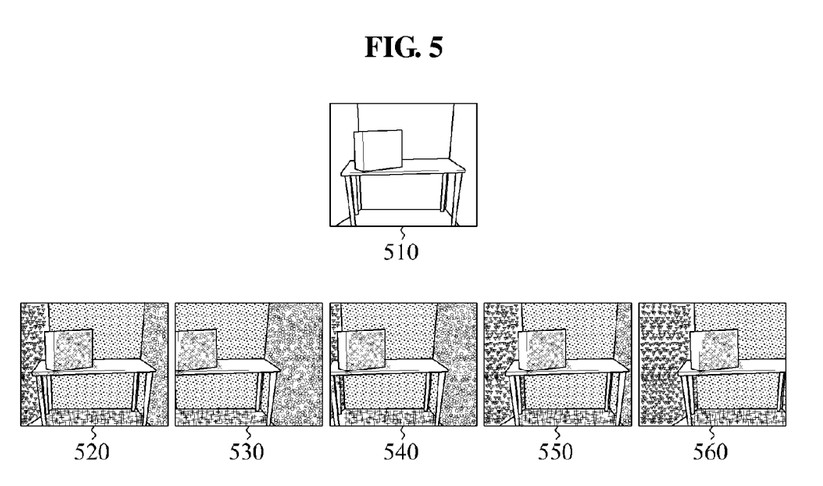
FIG. 5 illustrates an example of extracting planes from an image, according to example embodiments.

FIG. 5 illustrates an example of extracting planes from an image, according to example embodiments.

Referring to FIG. 5, the plane extracting unit 220 may extract, from an image 510, a plurality of planes included in image frames 520 through 560 based on changes in a camera motion. For example, the image 510 may correspond to a depth image generated by a depth camera. Depending on embodiments, the image 510 may correspond to a depth image generated from plural 2D color images. When objects included in the image 510, for example, a desk and a box on the desk, are captured while the camera moves, different images may be captured depending on viewpoints of the camera. Accordingly, the camera pose estimating unit 240 may estimate a pose of the camera by estimating a correspondence among the plurality of planes extracted.

For example, the correspondence estimating unit 230 may select planes included in a frame '520' to be target planes with respect to the image 510. The correspondence estimating unit 230 may select the target planes, and may store the selected target planes in a plane information database. For instance, the frame 520 may include, based on the desk, an upper portion indicated using the • symbol, a lower portion indicated using the • symbol, a floor indicated using the + symbol, a left portion indicated using the ▼ symbol, a right portion indicated using the ○ symbol, a box indicated using the × symbol, and the like, as the target planes. The correspondence estimating unit 230 may estimate the correspondence among the plurality of planes included in frames 520 through 560, by comparing the target planes included in the frame 520 to a plurality of planes included in frames 530 through 560. For example, comparing the frame 520 to the frame 530, a plane corresponding to the left portion ▼ of the desk is included in 520, however, is absent in the frame 530. In addition, comparing frames 520 to 560, a plane corresponding to the right portion ○ of the desk is included in the frame 520, however, is absent in the frame 560. When a new plane differing from the target planes is detected, the correspondence estimating unit 230 may newly store the new plane in the plane information database.

The camera pose estimating unit 240 may estimate a pose of the camera, based on the estimated correspondence. The camera pose estimating unit 240 may estimate rotation information of the camera or translation information of the camera using the correspondence, and may estimate the pose of the camera using the estimated rotation information or the estimated translation information.

In order to estimate the rotation information or the translation information of the camera, at least three pairs of corresponding planes may be required. The rotation information and the translation information may be estimated using a change in an identical plane when compared to a previous frame.

In order to estimate the rotation information, the camera pose estimating unit 240 may generate a rotation matrix R, using a normal vector among the plurality of planes for each frame included in the image using Equation 5 shown below.

$$\begin{bmatrix} a_1^1 & a_2^1 & a_3^1 \\ b_1^1 & b_2^1 & b_3^1 \\ c_1^1 & c_2^1 & c_3^1 \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} a_1^i & a_2^i & a_3^i \\ b_1^i & b_2^i & b_3^i \\ c_1^i & c_2^i & c_3^i \end{bmatrix} \quad \text{[Equation 5]}$$

In Equation 5, variables indicated using subscripts in $a_1$ through $c_3$ denote plane numbers, and a variable 1 or i indicated using superscripts in $a^1$ through $c^1$, or $a^i$ through $c^i$ denotes a camera index. In addition, $R_{11}$ through $R_{33}$ denote rotation matrices.

By converting Equation 5 into a linear system, Equation 6 as shown below may be obtained.

$$\begin{bmatrix} a_1^i & b_1^i & c_1^i & 0 & 0 & 0 & 0 & 0 & 0 \\ a_2^i & b_2^i & c_2^i & 0 & 0 & 0 & 0 & 0 & 0 \\ a_3^i & b_3^i & c_3^i & 0 & 0 & 0 & 0 & 0 & 0 \\ 0 & 0 & 0 & a_1^i & b_1^i & c_1^i & 0 & 0 & 0 \\ 0 & 0 & 0 & a_2^i & b_2^i & c_2^i & 0 & 0 & 0 \\ 0 & 0 & 0 & a_3^i & b_3^i & c_3^i & 0 & 0 & 0 \\ 0 & 0 & 0 & 0 & 0 & 0 & a_1^i & b_1^i & c_1^i \\ 0 & 0 & 0 & 0 & 0 & 0 & a_2^i & b_2^i & c_2^i \\ 0 & 0 & 0 & 0 & 0 & 0 & a_3^i & b_3^i & c_3^i \end{bmatrix} \quad \text{[Equation 6]}$$

The camera pose estimating unit 240 may generate a rotation matrix, using Equation 6. In general, a rotation matrix may need to have orthonormal characteristics. However, the rotation matrix obtained using Equation 6 may fail to satisfy such orthonormal characteristics. Accordingly, the camera pose estimating unit 240 may obtain an optimal rotation matrix in which orthonormal characteristics are reflected, by performing singular value decomposition (SVD), for example, as expressed by Equation 7 below.

$$[U\ V\ D] = SVD(R)$$

$$R = UD^T \quad \text{[Equation 7]}$$

In Equation 7, R denotes a rotation matrix in which orthonormal characteristics are reflected.

The camera pose estimating unit 240 may estimate rotation information of the camera, using the rotation matrix.

In order to estimate translation information, the camera pose estimating unit 240 may generate a translation matrix T, using the rotation matrix R, and a distance from the camera to each of the plurality of planes using Equation 8 shown below.

$$d_j^i = \frac{-a_j^1(R^{-1}T) - b_j^1(R^{-1}T) - c_j^1(R^{-1}T) + d_j^1}{\sqrt{(a_j^1)^2 + (b_j^1)^2 + (c_j^1)^2}}$$ [Equation 8]

In Equation 8, $d_j^i$ denotes a distance from a camera to each of the plurality of planes, i denotes a camera index, and j denotes a plane number. R denotes a rotation matrix, and T denotes a translation matrix.

Equation 8 may be expressed as Equation 9.

[Equation 9]

$$\begin{bmatrix} d_1^i \\ d_2^i \\ d_3^i \\ 1 \end{bmatrix} = \begin{bmatrix} -R_{11}a_1^1 - R_{12}b_1^1 - R_{13}c_1^1 & -R_{21}a_1^1 - R_{22}b_1^1 - R_{23}c_1^1 & -R_{31}a_1^1 - R_{32}b_1^1 - R_{33}c_1^1 & d_1^1 \\ -R_{11}a_2^1 - R_{12}b_2^1 - R_{13}c_2^1 & -R_{21}a_2^1 - R_{22}b_2^1 - R_{23}c_2^1 & -R_{31}a_2^1 - R_{32}b_2^1 - R_{33}c_2^1 & d_2^1 \\ -R_{11}a_3^1 - R_{12}b_3^1 - R_{13}c_3^1 & -R_{21}a_3^1 - R_{22}b_3^1 - R_{23}c_3^1 & -R_{31}a_3^1 - R_{32}b_3^1 - R_{33}c_3^1 & d_3^1 \\ 0 & 0 & 0 & 1 \end{bmatrix} \begin{bmatrix} T_x \\ T_y \\ T_z \\ 1 \end{bmatrix}$$

The camera pose estimating unit 240 may estimate translation information of the camera, using the translation matrix T.

In the example embodiments provided above, three planes are provided. When at least three planes are provided, the camera pose estimating unit 240 may estimate rotation information and translation information, using an overdetermined solution in a linear system.

The camera pose estimating unit 240 may obtain a transformation matrix RT in which a current camera motion is reflected based on a first camera, using the 3×3 rotation matrix R and the 3×1 translation matrix T using Equation 10 shown below.

$$RT = \begin{bmatrix} R_{3\times 3} & T_{3\times 1} \\ 0_{1\times 3} & 1 \end{bmatrix}$$ [Equation 10]

The camera pose estimating unit 240 may estimate a pose of the camera, using the transformation matrix.

When an outlier is present in the estimated pose of the camera, the camera pose estimating unit 240 may filter the outlier value. For example, the camera pose estimating unit 240 may remove the outlier value from the estimated pose of the camera using one of several different techniques, for example, an extended Kalman filter, or a particle filter, thereby alleviating a Jitter phenomenon.

Figure 6:
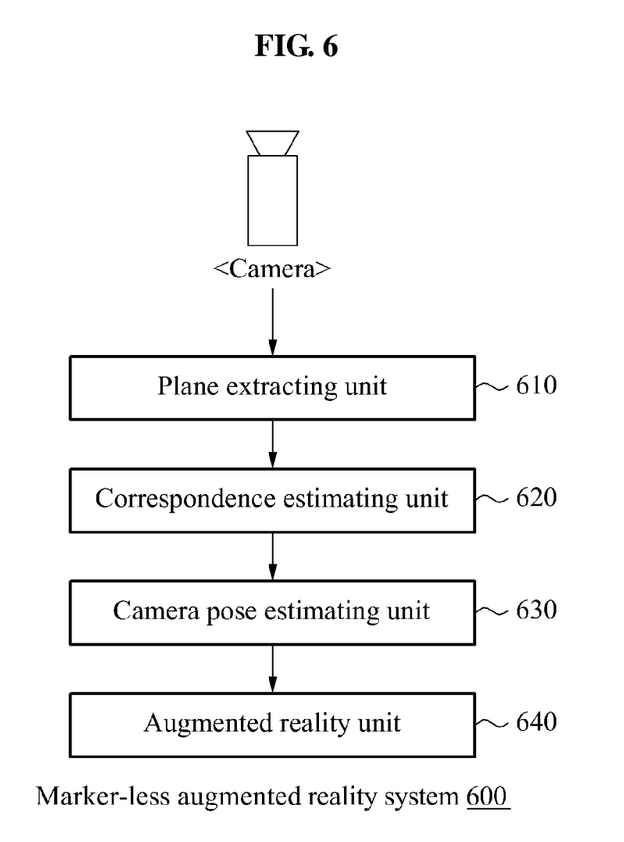
FIG. 6 illustrates a configuration of a marker-less augmented reality system, according to other example embodiments.

FIG. 6 illustrates a configuration of a marker-less augmented reality system, according to other example embodiments.

Referring to FIG. 6, a marker-less augmented reality system 600 may include a plane extracting unit 610, a correspondence estimating unit 620, a camera pose estimating unit 630, and an augmented reality unit 640. Each unit described above may include at least one processing device.

The plane extracting unit 610 may extract a plurality of planes included in an image generated by a camera, using 3D information of the image. For example, the plane extracting unit 610 may select a first point from the 3D information, and then may select a second point and a third point positioned within a distance corresponding to a threshold value from the first point. That is, the second point and the third point may be selected from within a threshold distance from the first point. The plane extracting unit 610 may extract the plurality of planes, based on the selected first point, the selected second point, and the selected third point. For example, the plane extracting unit 610 may generate a plane model using the first point, the second point, and the third point, and may extract the plurality of planes using the generated plane model.

The augmented reality unit 640 may match the image and a virtual object, using the plurality of planes extracted.

In order to match the image and the virtual object, the camera pose estimating unit 630 may estimate a pose of the camera, based on a correspondence among the plurality of planes extracted. Estimating the pose of the camera may refer to estimating rotation information or translation information of the camera. In addition, the correspondence may be obtained by the correspondence estimating unit 630.

The correspondence estimating unit 630 may select a target plane, based on one of a number of points included on the plurality of planes extracted, a direction of a normal vector between the plurality of planes, and a distance from the camera to each of the plurality of planes. The correspondence estimating unit 630 may estimate the correspondence among the plurality of planes, based on a direction of a normal vector between the target plane and planes included in each frame, or a distance from the camera to each of the plurality of planes.

Figure 7:
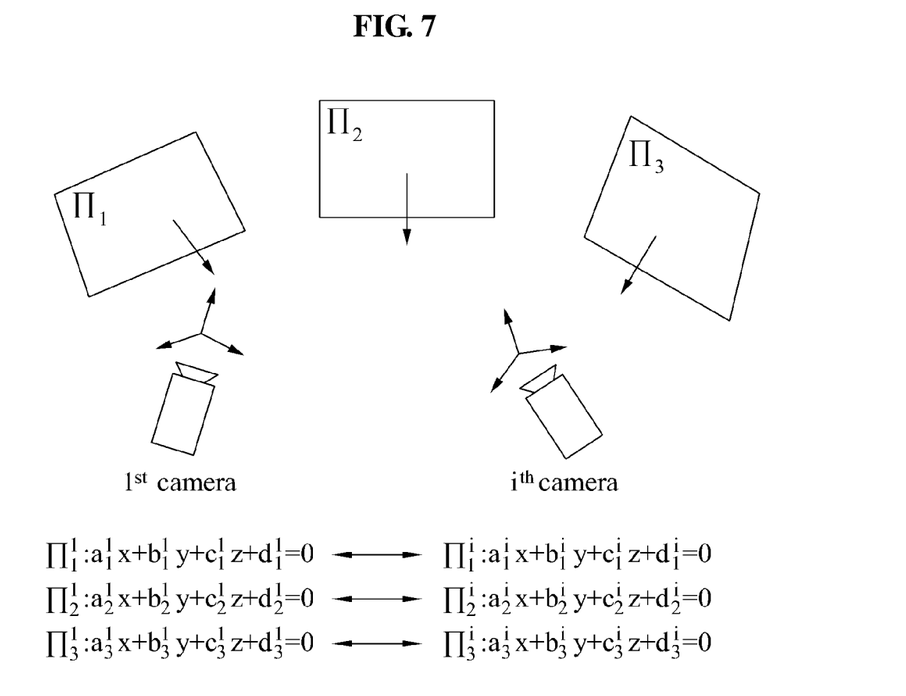
FIG. 7 illustrates an example of estimating a pose of a camera using plane features, according to example embodiments.

FIG. 7 illustrates an example of estimating a pose of a camera using plane features, according to example embodiments.

Referring to FIG. 7, the correspondence estimating unit 630 may estimate a correspondence between planes $\Pi_1^1$ through $\Pi_3^1$ extracted from a first camera and planes $\Pi_1^i$ through $\Pi_3^i$ extracted from an $i^{th}$ camera. For example, a relatively small camera motion may indicate that an interval difference in normal vectors between adjacent frames may be relatively small. Accordingly, the correspondence estimating unit 630 may estimate the correspondence among the plurality of planes, based on a normal vector constituting each of the plurality of planes, and a distance from a camera to each of the plurality of planes.

The correspondence estimating unit 630 may select a single frame from among a plurality of frames constituting the image to be a reference frame. For example, when a first frame is selected to be the reference frame, and a currently extracted frame corresponds to the first frame, the correspondence estimating unit 630 may select a target plane to be tracked in reality from among the plurality of planes extracted, and may store the selected target plane in a database. The correspondence estimating unit 630 may estimate the correspondence among the plurality of planes, based on the target plane included in the selected reference frame.

The augmented reality unit 640 may match the image and a virtual object, based on the estimated pose of the camera.

Figure 8:
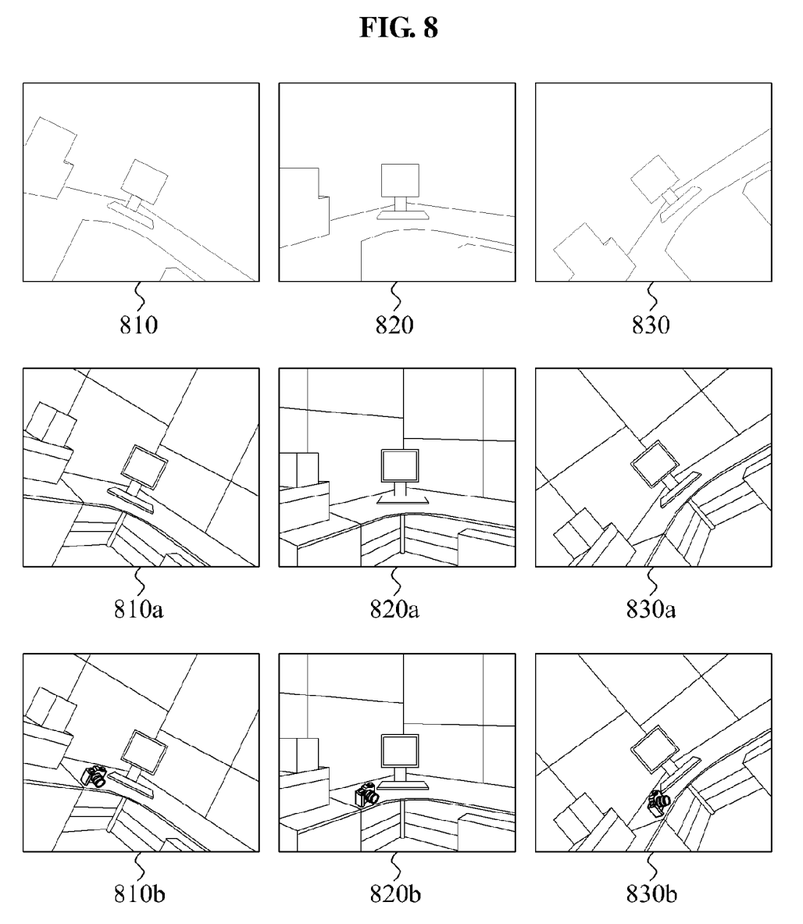
FIG. 8 illustrates an example of matching an image and a virtual object, according to example embodiments.

FIG. 8 illustrates an example of matching an image and a virtual object, according to example embodiments.

Referring to FIG. 8, depth images 810 through 830 may be captured with respect to an identical object while a camera rotates from a left side to a right side. For example, the depth image 810 may correspond to a depth image captured by rotating a camera, for example, a depth camera, to the right side. The depth image 820 may correspond to a depth image captured by the camera in front of the object. The depth image 830 may correspond to a depth image captured by rotating the camera to the left side. In addition, an image 810a may correspond to a color image captured by rotating a camera, for example, a color camera, to the right side. An image 820a may correspond to a color image captured by the camera in front of the object. An image 830a may correspond to a depth image captured by rotating the camera to the left side.

The augmented reality unit 640 may generate images 810b through 830b, by matching a virtual object, for example, a camera, to the color images 810a through 830a, respectively. The image 810b may correspond to an image acquired by matching the virtual object to the color image 810a. The image 820b may correspond to an image acquired by matching the virtual object to the color image 820a. The image 830b may correspond to an image acquired by matching the virtual object to the color image 830a.

For example, the depth images 810 through 830 and the color images 810a through 830a may be construed as having identical viewpoints, respectively. For example, when the depth images 810 through 830 and the color images 810a through 830a have identical viewpoints, respectively, the augmented reality unit 640 may generate the images 810b through 830b in which the virtual object, that is, the camera, is matched to the color images 810a through 830a, respectively.

Conversely, when the depth images 810 through 830 and the color images 810a through 830a have different viewpoints, the augmented reality unit 640 may perform calibration using the estimated pose of the camera so that the depth images 810 through 830 and the color images 810a through 830a may have identical viewpoints, respectively. That is, the augmented reality unit 640 may match viewpoints of the depth images 810 through 830 to viewpoints of the color images 810a through 830a, and thereby may generate the images 810b through 830b by matching the virtual object to the color image 810a through 830a, respectively.

Accordingly, the marker-less augmented reality system 600 may estimate the pose of the camera using the features of at least one plane, without preparations in advance, for example, storing reference objects in a database in advance, and the like, whereby a marker-less augmented reality system may be established.

Figure 9:
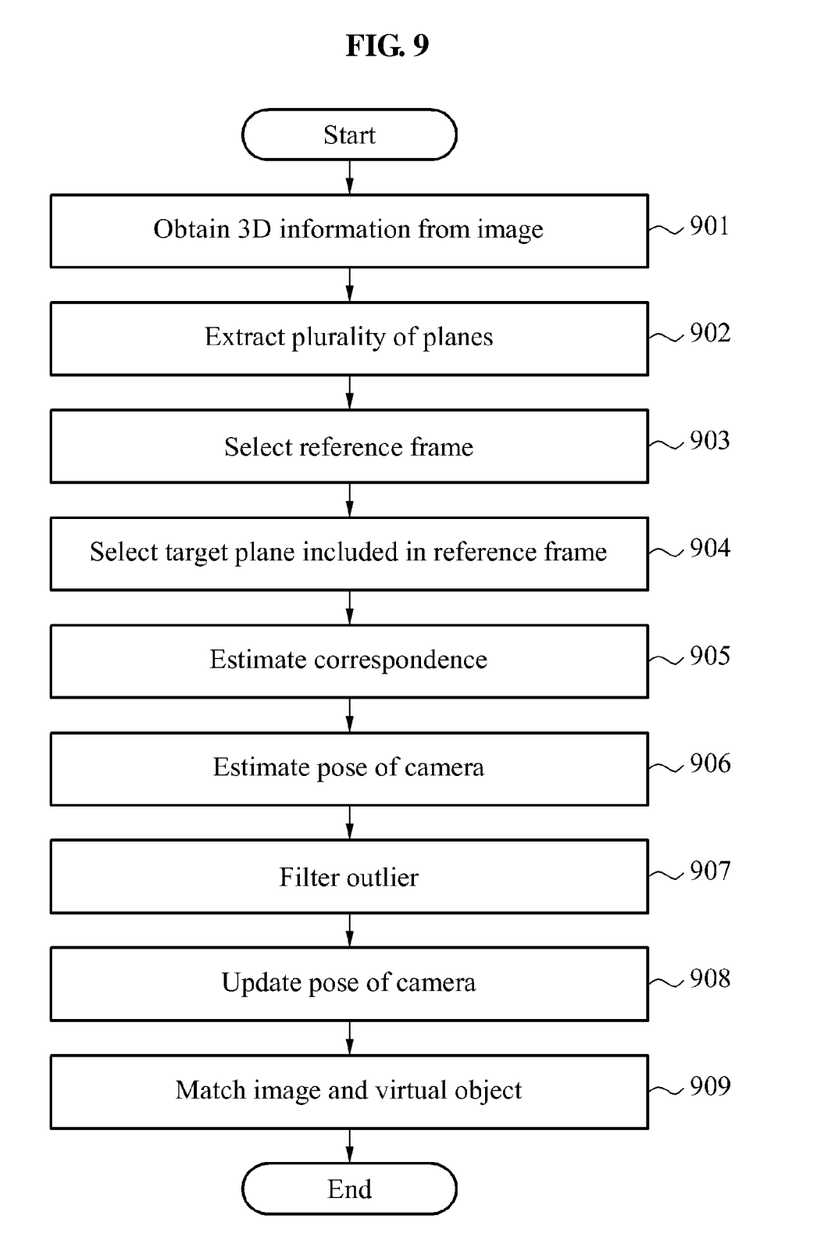
FIG. 9 is a flowchart illustrating an operating method of a marker-less augmented reality system, according to example embodiments.

FIG. 9 is a flowchart illustrating an operating method of a marker-less augmented reality system, according to example embodiments. The method of FIG. 9 may be performed by the marker-less augmented reality system 200 of FIG. 2 or the marker-less augmented reality system 600 of FIG. 6.

Referring to FIG. 9, in operation 901, a marker-less augmented reality system may obtain 3D information from an image. For example, the marker-less augmented reality system may obtain depth information from a depth image acquired by a depth camera, as 3D information. In addition, depending on embodiments, the marker-less augmented reality system may obtain 3D information using color images acquired by a plurality of color cameras.

Hereinafter, both a depth image and a color image will be referred to as an 'image.'

In operation 902, the marker-less augmented reality system may extract a plurality of planes included in the image, using the 3D information. For example, the marker-less augmented reality system may select a first point from the 3D information, and then may select a second point and a third point such that the second and third points are positioned within a distance corresponding to a threshold value from the first point. The marker-less augmented reality system may extract the plurality of planes, based on the selected first point, the selected second point, and the selected third point.

In operation 903, the marker-less augmented reality system may select a reference frame from among a plurality of frames constituting the image. For example, the marker-less augmented reality system may select a first frame among the plurality of frames to be the reference frame.

In operation 904, the marker-less augmented reality system may select a target plane included in the selected reference frame. For example, the marker-less augmented reality system may select the target plane, based on one of a number of points included in the plurality of planes extracted, a direction of a normal vector between the plurality of planes, and a distance from the camera to each of the plurality of planes.

In operation 905, the marker-less augmented reality system may estimate a correspondence among the plurality of planes, based on the target plane. For example, the marker-less augmented reality system may estimate the correspondence among the plurality of planes, based on a direction of a normal vector between the target plane and planes included in each frame, or a distance from the camera to each of the plurality of planes.

In operation 906, the marker-less augmented reality system may estimate a pose of the camera, based on the estimated correspondence. For example, the marker-less augmented reality system may generate a rotation matrix based on a normal vector between the plurality of planes for each frame included in the image, and may estimate rotation information based on the generated rotation matrix, thereby estimating the pose of the camera based on the estimated rotation information. In addition, the marker-less augmented reality system may generate a translation matrix based on the generated rotation matrix, and a distance from the camera to each of the plurality of planes, and may estimate translation information based on the generated translation matrix, thereby estimating the pose of the camera based on the estimated translation information.

In operation 907, the marker-less augmented reality system may filter an outlier from the estimated pose of the camera. For example, the marker-less augmented reality system may remove the outlier from the estimated pose of the camera using, e.g., an extended Kalman filter or a particle filter, thereby alleviating a Jitter phenomenon, however, the present disclosure is not limited thereto.

In operation 908, the marker-less augmented reality system may update a pose of the camera from which the outlier is removed.

In operation 909, the marker-less augmented reality system may match the image and a virtual object, using the updated pose of the camera.

The above-described exemplary embodiments of the present invention may be recorded in computer-readable media including program instructions to implement various operations embodied by a computer. The media may also include, alone or in combination with the program instructions, data files, data structures, and the like. The program instructions stored in the media may be specially designed and configured for the present invention, or may be known to those skilled in the art and thereby be implemented. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the marker-less augmented reality system may include at least one processor to execute at least one of the above-described units and methods.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents

The invention claimed is:

1. A marker-less augmented reality system, comprising:
a processor comprising:
a plane extractor configured to extract a plurality of planes included in a plurality of frames constituting an image, based on three-dimensional (3D) information of the image generated by a camera;
a correspondence estimator configured to select a single frame from among the plurality of frames to be a reference frame, and to estimate a correspondence among the extracted plurality of planes, based on a target plane included in the selected reference frame; and
a camera pose estimator configured to estimate a pose of the camera,
based on a type of information according to the estimated correspondence,
after the reference frame has been determined, wherein the correspondence estimator is further configured to estimate the correspondence among the plurality of planes, based on one of a direction of a normal vector between the target plane and planes included in each frame.

2. The system of claim 1, wherein the plane extractor selects a first point from the 3D information, selects a second point and a third point positioned within a threshold distance from the first point, and generates a plane model based on the selected first point, the selected second point, and the selected third point.

3. The system of claim 2, wherein the plane extractor extracts the plurality of planes in the image, based on the generated plane model.

4. The system of claim 1, wherein the correspondence estimator estimates the correspondence among the plurality of planes based on the normal vector of each of the plurality of planes.

5. The system of claim 1, wherein the correspondence estimator selects the target plane, based on one of a number of points included in the plurality of planes extracted, the direction of the normal vector between the plurality of planes, and a distance from the camera to each of the plurality of planes.

6. The system of claim 1, wherein the correspondence estimator further estimates the correspondence among the plurality of planes, based on a distance from the camera to each of the plurality of planes.

7. The system of claim 5, wherein the correspondence estimator stores the selected target plane and stores a plane from among the plurality of planes differing from the target plane.

8. The system of claim 1, wherein the camera pose estimator estimates rotation information or translation information of the camera based on the estimated correspondence, and estimates the pose of the camera based on the estimated rotation information or the estimated translation information.

9. The system of claim 1, wherein the camera pose estimator generates a rotation matrix based on a normal vector between planes for each frame included in the image, generates a translation matrix based on the generated rotation matrix, and a distance from the camera to each of the planes, and generates a transformation matrix based on the generated rotation matrix and the generated translation matrix.

10. The system of claim 9, wherein the camera pose estimator estimates the pose of the camera using the generated translation matrix.

11. The system of claim 1, further comprising:
an augmented reality matcher configured to match the image and a virtual object of the image, using the plurality of planes extracted.

12. The system of claim 11, wherein the augmented reality matcher matches the image and the virtual object, based on the estimated pose of the camera.

13. The system of claim 1, wherein rotation information or translation information of the camera is estimated based on a change in an identical plane when compared to a previous frame.

14. The system of claim 1, wherein the camera pose estimator is configured to filter outlier values from the estimated pose of the camera.

15. An operating method of a marker-less augmented reality system, the method comprising:
extracting a plurality of planes included in a plurality of frames constituting an image, based on three-dimensional (3D) information of the image generated by a camera;
selecting a single frame from among the plurality of frames to be a reference frame;
estimating a correspondence among the extracted plurality of planes, based on a target plane included in the selected reference frame, and
estimating a pose of a camera, based on
a type of information according to the estimated correspondence,
wherein the estimating of the correspondence comprises:
after the reference frame has been determined,
estimating the correspondence among the plurality of planes, based on one of a direction of a normal vector between the target plane and planes included in each frame.

16. The method of claim 15, further comprising:
matching the image and a virtual object, based on the estimated pose of the camera.

17. The method of claim 15, wherein the extracting comprises:
selecting a first point from the 3D information;
selecting a second point and a third point positioned within a threshold distance from the first point; and
extracting the plurality of planes based on the selected first point, the selected second point, and the selected third point.

18. The method of claim 15, further comprising:
estimating a correspondence among the plurality of planes, based on the normal vector constituting each of the plurality of planes, or distance from the camera to each of the plurality of planes.

19. The method of claim 15, wherein the estimating of the correspondence further comprises:

estimating the correspondence among the plurality of planes, based on a distance from the camera to each of the plurality of planes.

20. The method of claim 15, wherein the estimating of the correspondence further comprises:

selecting a target plane, based on one of a number of points included on the plurality of planes extracted, the direction of the normal vector between the plurality of planes, and a distance from the camera to each of the plurality of planes.

21. The method of claim 15, wherein the estimating of the pose of the camera comprises:

generating a rotation matrix based on a normal vector between planes for each frame included in the image;

estimating rotation information based on the generated rotation matrix; and estimating the pose of the camera based on the estimated rotation information.

22. The method of claim 21, wherein the estimating of the pose of the camera comprises:

generating a translation matrix based on the generated rotation matrix, and a distance from the camera to each of the plurality of planes;

estimating translation information based on the generated translation matrix; and estimating the pose of the camera based on the estimated translation information.

23. The method of claim 15, further comprising:

matching the image and a virtual object of the image, using the extracted plurality of planes.

* * * * *